United States Patent Office 2,924,318
Patented Feb. 9, 1960

2,924,318

"SMALL PRESS" CONTROL USING STATIC DEVICES

Joseph W. Smith, Tonawanda, and George E. King, Eggertsville, N.Y., assignors to Westinghouse Electric Corporation, East Pittsburgh, Pa., a corporation of Pennsylvania Application June 19, 1957, Serial No. 666,584

10 Claims. (Cl. 192—142)

This invention relates to machine tool control circuits, and relates more particularly to circuits utilizing static logic decision units for controlling the operation of punch presses.

Punch presses used with dies are usually driven through flywheels and clutches from electric motors. The clutch of such a press is engaged by the depression by an operator of a Run push button following which the cycle is automatically completed. As Inch push button is provided for enabling the operator to inch the press forward during its down stroke as sometimes is required.

This invention controls the Run cycle of a press by static logic decision units. A Selector switch for Inch operation is provided and another Selector switch for Run operation is provided. A static MEMORY unit receives through a logic circuit an on signal when the Run Selector switch is closed, and delivers an output signal to one input of a two-input AND unit.

When the Run push button is depressed, it supplies through the logic circuit an on signal to a second MEMORY unit which delivers an output signal to a second AND unit. The two AND units control through a magnetic amplifier the engagement of the clutch of the press. After the press has started, a limit switch driven by it turns off the first MEMORY unit and turns on the second MEMORY unit, transferring the control of the clutch to the latter so that the Run push button can be released by the operator.

The logic circuit is not used to control an Inch operation. When the selector switch is set to Inch position, the signal which turns on the first MEMORY unit is removed, and connections are made to control the press directly by the depression of the Inch push button.

Several Run push buttons at different operator positions may be provided. When this is done, then only one Run push button is used, the others being dummy-plugged. To prevent the press from operating when all Run push buttons are dummy-plugged, the logic circuit acts to turn off both of the MEMORY units.

Another feature of this invention is that the output of the magnetic amplifier is used to control the engagement of the clutch through a control relay which has a normally closed contact which turns off a signal lamp when the relay is energized, indicating the proper operation of the relay and the magnetic amplifier.

Another feature of this invention is that a trouble relay is provided and connected to open contacts in series with the power supply to the press motor and to the logic circuits when the magnetic amplifier has an output without the control relay being energized. This trouble relay has its speed of response slowed down so as to give the control relay sufficient time to act first.

An object of this invention is to control an operation of a press by static logic decision elements.

Another object of this invention is to control Run operation of a punch press with static logic decision elements, and to control Inch operation of the press manually.

Another object of this invention is to control the engagement of the clutch of a power press with a magnetic amplifier controlling a relay, and to deenergize the press upon failure of the relay.

This invention will now be described with reference to the annexed drawings, of which:

Figure 1:
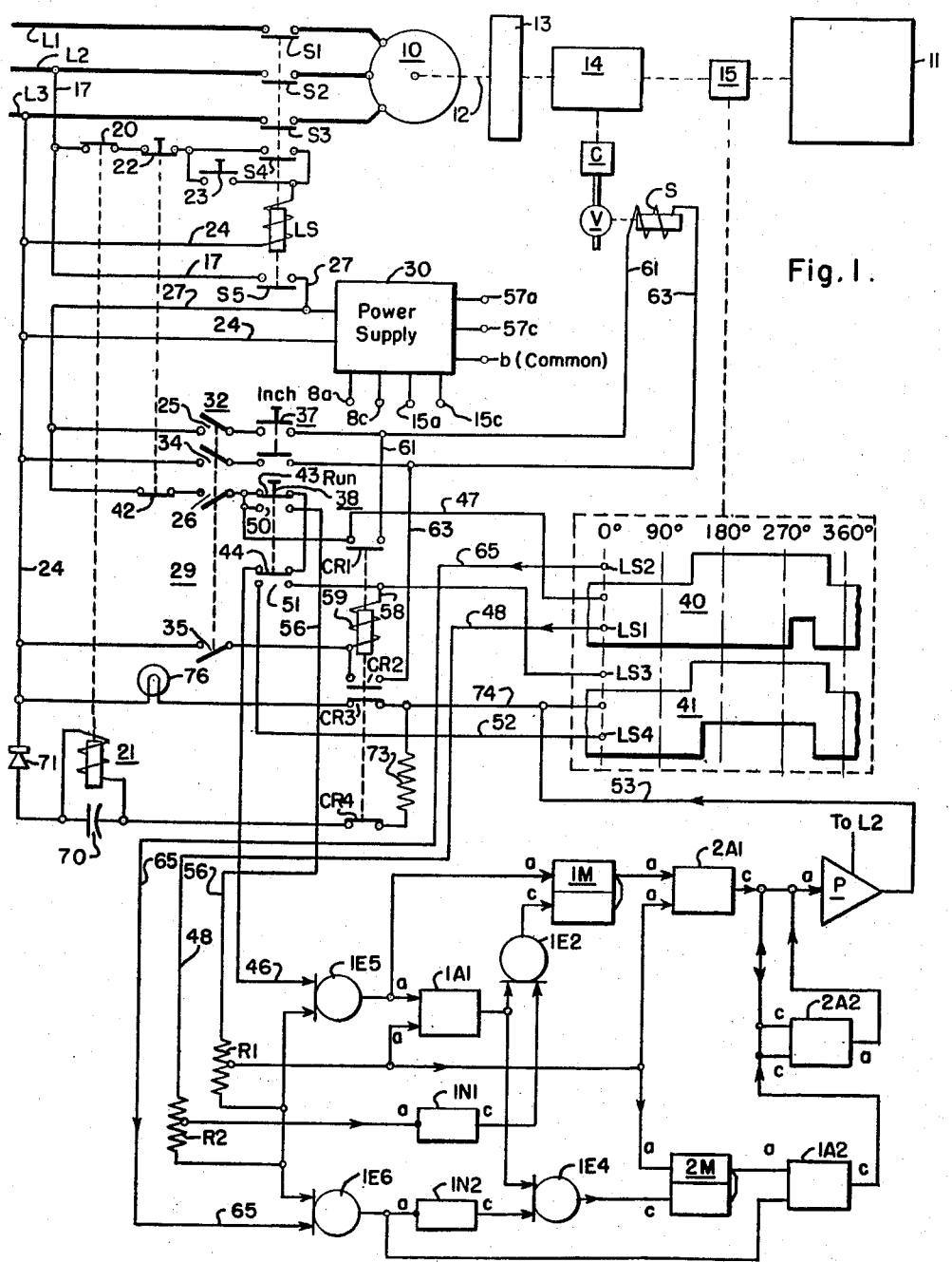
Fig. 1 is a schematic diagram of a system utilizing static logic decision elements embodying this invention for controlling a punch press.
Figure 3:
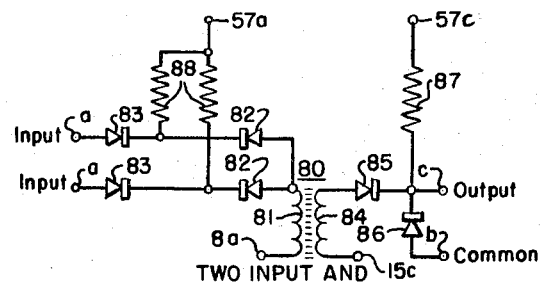
Fig. 3 is a circuit schematic of a two-input AND unit as used in the system of Fig. 1.
Figure 4:
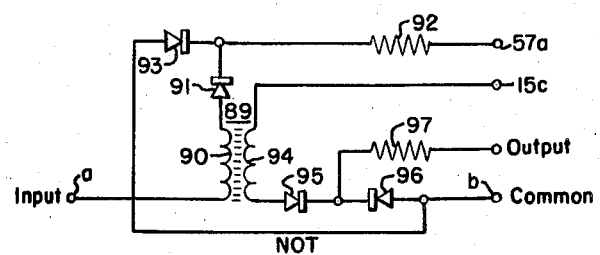
Fig. 4 is a circuit schematic of a NOT unit as used in the system of Fig. 1.
Figure 5:
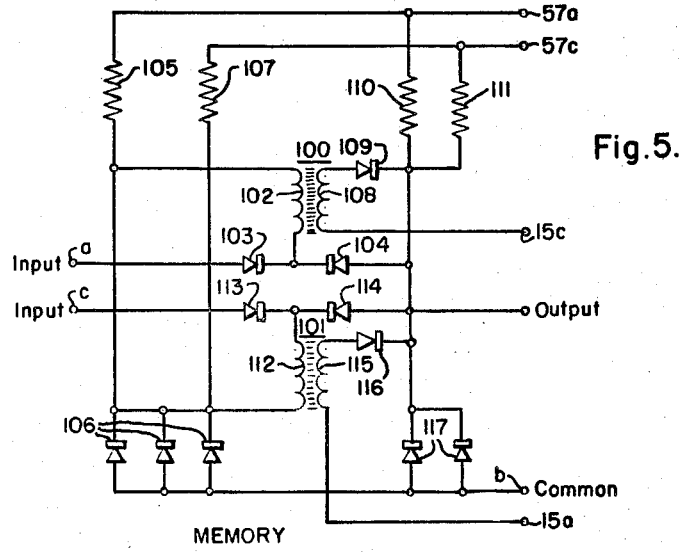
Fig. 5 is a circuit schematic of a MEMORY unit as used in the system of Fig. 1.

The AND, OR, NOT and MEMORY circuits for use in the practice of this invention are similar to those described in the July 1956 edition of Westinghouse Engineer, volume 16, No. 4, published by Westinghouse Electric Corporation, Pittsburgh, Pennsylvania, since the AND, NOT and MEMORY circuits must have their A.C. and D.C. supply terminals connected to corresponding terminals of their power supply having the proper phases or polarities, these circuits are shown by Figures 3–5 of the drawings for the purpose of explaining how their connections to the A.C. and D.C. power supply terminals of Fig. 1 should be made. It is also believed to be proper at this time to describe those logic circuits generally as follows:

An AND circuit is a circuit that responds to a plurality of signals having the same phase, and has an output signal only when all of the signals are present. The phase of the output signal of an AND circuit is opposite to that of its input signals. A one-input AND circuit can be used for phase reversal when only one input signal is present. Fig. 3 shows a two-input AND circuit having two terminals legended Input which are indicated to receive input signals $a$. It has a terminal legended Output which is indicated to provide a $c$ output signal. The $a$ and $c$ signals have opposite phase. The circuit of Fig. 3 has a transformer 80 with a core having a rectangular hysteresis loop, and which has a reset winding 81 connected at one end through oppositely poled diodes 82 and 83 to the Input terminals, and connected at other end to the 8-volt A.C. terminal 8$a$ of Fig. 1. The transformer 80 has a gate winding 84 connected at one end through diode 85 to the Output terminal. The diode 85 is connected through an oppositely poled diode 86 to $b$ (common) terminal of Fig. 1. The Output terminal is connected through a resistor 87 to the positive 57-volt D.C. terminal 57$c$ of Fig. 1. The other end of the winding 84 is connected to the 15-volt A.C. terminal 15$c$ of Fig. 1. The midpoint connections of the diodes 82 and 83 are connected through resistors 88 to the negative 57-volt D.C. terminal 57$a$ of Fig. 1.

If the input signal is a $c$ signal, all power connections of Fig. 3 would be reversely connected to the power supply terminals of Fig. 1. That is, the 57$a$ and 8$a$ terminals of Fig. 3 would be connected to the 57$c$ and 8$c$ respectively terminals of Fig. 1, and the 15$c$ terminal of Fig. 3 would be connected to the 15$a$ terminal of Fig. 1.

Control of the input of Fig. 3 is derived from the reset winding 81 magnetizing force which is opposite in phase to that of the gate winding 84. With an input missing, thus resetting the core, no output of a specified phase $a$ or $c$ is produced. When a voltage of the proper magnitude and phase is introduced in an input signal, the rectifiers 82 and 83 are blocked when the reset current is zero so that the gate winding circuit causes the core to saturate, and produces a half-wave output.

A NOT circuit is a circuit which has substantially zero output when an input control signal of the proper phase is applied thereto, and has an output signal when there is no input signal. Fig. 4 shows such a circuit, and comprises a transformer 89 having a core with a rectangular hysteresis loop, with a reset winding 90 connected at one end to an Input terminal and at the other end through diode 91 and resistor 92 to supply terminal 57a of Fig. 1. The diode 91 would be connected through an oppositely poled diode 93 to the b terminal of Fig. 1. The transformer 89 has a gate winding 94 connected at one end to the 15c terminal of Fig. 1, and connected at its other end through oppositely poled diodes 95 and 96 to the b terminal. The junction connection of the diodes 95 and 96 is connected through a resistor 97 to the Output terminal. No A.C. resetting voltage is used in this circuit as in the case of Figs. 3 and 5. Exciting current in the gate winding 94 causes the core to saturate when no input signal of the proper phase is present, and to produce an output signal. When an input signal of the proper phase and magnitude is present, reset current flows through the reset winding 90 which is 180° out-of-phase with the gating voltage, so that there is no output. The circuit as shown is for receiving an input signal. If a c input signal is to be received, the connection to 57a would be changed to 57c, and the connection to 15c would be changed to 15a.

A MEMORY circuit is a bistable circuit that, in response to a first input signal, produces an output signal that is maintained even though the first signal has ended. The MEMORY circuit is reset and the output signal is terminated in response to a second input signal having the opposite phase to the first signal. Fig. 5 shows a MEMORY circuit having transformers 100 and 101 with cores having rectangular hysteresis loops. The transformer 100 has a reset winding 102 connected at one end through diode 104 to the Output terminal. The winding 102 is connected at its other end through resistor 105 to the 57a terminal of Fig. 1, and connected through parallel connected diodes 106 to the b connections of Fig. 1. The gating winding 108 of the transformer 100 is connected through diode 109 and resistor 110 to the 57a terminal of Fig. 1, and through resistor 111 to the 57c terminal of Fig. 1. The other end of the winding 108 is connected to the 15c terminal of Fig. 1.

The transformer 101 has a reset winding 112 connected through diode 113 to the Input terminal having a c input and through diode 114 to the Output terminal. The other end of the winding 112 is connected through the diodes 106 to the b terminal of Fig. 1, and through the resistor 105 to the 57a terminal and through resistor 107 to the 57c terminal of Fig. 1. The transformer 101 has a gating winding 115 connected through diode 116 to the Output terminal, and through the parallel connected diodes 117 to the b connection, and connected at its other end to the 15a terminal of Fig. 1.

The MEMORY circuit is seen to consist of two NOT circuits which are sensitive to opposite phase input signals. A continuous output is provided when the first input signal c occurs, and the output is stopped when the second input signal a occurs. The NOT circuits are connected in parallel, but the A.C. voltages are connected with the phase relationships shown, so that one of the two cores is gating while the other is resetting. The common output voltage is fed back to the common control circuit so that the output of one NOT circuit serves as the input to the other. Once an output has been established, a signal is continuously provided to maintain this output without the necessity of applying an external signal. If the input terminal shown receiving an a input signal is to receive a c input signal, and the input terminal shown receiving a c input signal is to receive an a signal, then the power supply connections to the terminals having a and c suffixes would be reversed.

In the following descriptions of the operation of the MEMORY units, the upper and lower Input terminals are the on and off terminals respectively. On Fig. 1, the Input signals to the AND, NOT and MEMORY units are shown as a or c so that the proper connections to the power supply can be made.

An OR circuit supplies an output signal when any input signal is applied. It requires no A.C. or D.C. connections and so is not shown. It may have only a single input, acting as a diode.

An electric motor 10 connected to electric lines L1, L2 and L3 through contacts S1, S2 and S3 drives a press 11 through a shaft 12 to which is connected a flywheel 13, a clutch 14 and a limit switch drum 15. The contacts S1, S2 and S3 are adapted to be closed by a line starter solenoid LS when the latter is connected to lines L2 and L3 by the closing of start switch 23. The energizing circuit of the solenoid may be traced as follows: From L2 through conductor 17 normally closed contacts 20 of trouble relay 21, the stop switch 22, start switch 23, the solenoid LS and conductor 24 to L3.

The solenoid LS also has auxiliary contacts S4 and S5 which are closed when the solenoid is energized. Contacts S4 are bridged over the contacts of the Start switch 23 in a holding circuit. The contacts S5, when closed, connect contacts 25, one of the contacts of Selector Inch switch 32, through conductor 27 to line L2, and connects contacts 26, one of the contacts of the Selector Run switch 29, through conductor 27 and contacts 42 of the stop switch to line L2. S5 also connects A.C. and D.C. power supply 30 for the logic units to lines L2 and L3, the connection to L3 being through conductor 24.

The Selector Run switch includes contacts 26 and 35 and the Selector Inch switch 32 includes contacts 25 and 34. Contacts 34 and 35 are through conductor 24 connected to line L3. One or the other selector switches 32 or 29 is closed by the operator of the press in a preliminary step, following which the corresponding Inch push button 37 or Run push button 38 is depressed for starting the press.

In actual field practice Selector switches 29 and 32 are interlocked, as diagrammatically shown, so that contacts 25 and 34 remain open when contacts 26 and 35 are closed, and contacts 26 and 35 remain open when contacts 25 and 34 are closed.

The A.C. and D.C. power supply 30 is for supplying voltage having the proper polarity and phase to the AND, NOT and MEMORY units of Fig. 1 as described in connection with Figs. 3–5.

The limit switch drum 15 has limit switch segments 40 and 41 shown in developed form for clearness of explanation. Limit switch contacts LS1 and LS2 touch segment 40, and limit switch contacts LS3 and LS4 touch switch segment 41 for completing circuits as will be described later.

The clutch 14 is adapted to be engaged by a piston in cylinder C when solenoid S is energized to open valve V for admitting compressed air, from a conventional source which is not shown, into the cylinder C for moving its piston forward.

Closing the Selector Run switch 29 closes contact 26 and connects this contact 26, previously described as connected to L2 through Stop switch 42, to the normally closed, or up contacts 43 and 44 of the Run push button 38, through conductor 46 and OR unit 1E5 to the on input of MEMORY unit 1M turning 1M on. At the same time, a signal is applied through conductor 47, limit switch segment 40, limit switch contact LS1, conductor 48 and resistor R2 to NOT unit 1N1 which has no output signal. At the same time a signal is applied to one input of AND unit 1A1. There is no signal at this time at the on input of the MEMORY unit 2M so that it is off at this time through an off signal being applied to its off input through OR unit 1E4 by NOT unit 1N2. LS2 later supplies a signal to 1N2 when LS2 touches segment 40. AND unit 1A1 is connected through OR unit 1E2 to the off input of MEMORY unit 1M for turning it off when 1A1 has an output.

The Run push button 38 is depressed to start the press, and closes run contacts 50 and 51. Limit switch contact LS4 is in contact with switch segment 41 at the start, and through contacts 35, solenoid 59 of relay CR2, conductor 58, contacts 51, conductor 52, segment 41, and conductor 53 connects magnetic amplifier P to L3. Signals are supplied from Run contacts 50, conductor 56 and resistor R1 to the other input of AND unit 1A1, to one input of AND unit 2A1, and to the on input of the MEMORY unit 2M. 2M also has an off signal applied from 1N2, and has no output. The last-mentioned signal to 1A1 does not cause the latter to have an output signal, since the first signal to 1A1 was removed by depressing the Run push button, opening its up, normally closed contacts. The first signal to 1A1 was, however, applied to MEMORY unit 1M and turned the latter on. Due to the Memory of 1M, a signal is applied to the other input of AND unit 2A1, causing the latter to have an output which is applied to both inputs of AND unit 2A2 and to the magnetic amplifier P. The AND units deliver two positive half-wave signals (one full-wave signal) to amplifier P causing it to energize solenoid 59 of the control relay CR2. The control relay CR2 then closes its contacts CR1 and CR2. Contacts CR1 connect one side of the solenoid S through conductor 61 to energize conductor 47. Contacts CR2 connect the other side of the solenoid S through conductor 63 and contacts 35 to supply line L3. The solenoid S is energized and opens the valve V, admitting compressed air into the cylinder C to engage the clutch 14 for starting the press.

When the press has progressed to about 135° of its complete cycle, which is just before the maximum pressure point, limit switch contacts LS2 and LS3 touch the segments 40 and 41, respectively, and shortly thereafter limit switch contact L14 leaves the segment 41. LS3 and segment 41 close a circuit around Run push button contacts 51 and LS4 and segment 41 for maintaining the amplifier P energized from the supply lines when the Run pushbutton is released. LS2 and segment 40 transfer control of the press from MEMORY unit M1 to MEMORY unit M2 as will be described later. The operator can now release the Run push button and devote his attention to feed or other duties.

When LS2 touches the segment 40, an input signal is supplied through conductor 65 and OR unit 1E6 to AND unit 1A2. Also, a signal is supplied through 1E6 to NOT unit 1N2. Since a signal to a NOT unit causes it to have no output signal, the off signal applied by 1N2 to MEMORY unit 2M is removed, and 2M has an output signal. This output signal combined with the signal from LS2 in 1A2 causes 1A2 to have on output signal which keeps 2A2 on. 1A2 delivers one half-wave of a full-wave D.C. signal to the amplifier P, and 2A2 delivers the other half-wave of the full wave D.C. signal to the amplifier P, causing the amplifier P to maintain the control relay energized and the clutch engaged.

The operator should not let up on the Run push button before LS2 touches switch segment 40, otherwise the signal is removed from 2A1 and 1A2, and unless 1A2 has an output signal, the press will stop.

After approximately 270° of the cycle of the press, the limit switch contact LS1 leaves the switch segment 40. This removes the signal from the input of the NOT unit 1N1 which then supplies an output signal through OR unit 1E2 to the off input of MEMORY unit 1M, turning 1M off. LS1 then again touches the segment 40 to remove the signal from 1N1 so that 1M can be turned on again for the next cycle, but in order to turn it on, the Run push button must be released, since this signal to 1N1 is applied through the up, normally closed contacts of the Run push button.

At about 350°, near the end of the cycle, the limit switch contacts LS2 and LS3 leave the segments 40 and 41, respectively. The circuit including LS2 and OR unit 1E6 is opened. This removes the input signal to the NOT unit 1N2 which turns off the MEMORY unit 2M, and removes the signal from LS2 to the AND unit 1A2. 1A2 and 2A2 have no output signals, and the amplifier P has no input signals. The control relay is deenergized, and the clutch is disengaged. The connection of the amplifier P to the supply lines is broken by LS3 leaving segment 41. The press is ready for the next cycle.

In some operations, as many as four Run push buttons are used at four stations. When this is the case, it is sometimes desirable to use only one or two stations at a time. The user then has a provision for dummyplugging the unused Run push buttons. When this is done, the up and down contacts of the dummy-plugged push buttons are closed, and if all are plugged to prevent the press from operating, the AND unit 1A1 will receive both of its input signals from the up and down contacts of the Run push buttons, and will apply an output signal through the OR unit 1E2 to the off input of MEMORY unit 1M, and through the OR unit 1E4 to the off input of MEMORY unit 2M turning both MEMORY units off, so that the clutch cannot be engaged.

Figure 2:
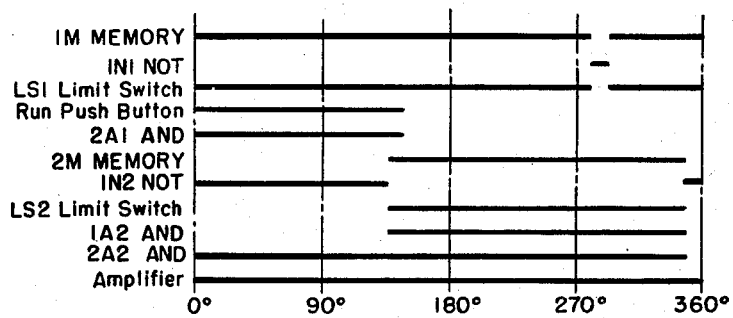
Fig. 2 is a bar chart showing the sequence and length of operation of the control units of Fig. 1.

A summary of the operation will now be described with reference to Figs. 1 and 2. 1M is turned on by normally closed Run push button contacts, and turned off by the NOT unit 1N1. 1N1 is held off by a signal from LS1. The signal from LS1 combines with the output signal from 1M to operate 2A1. The Run push button contacts also supply a signal to the on input of 2M but 2M will not have an output signal until the off signal is removed from 1N2 through LS2. Outputs of LS2 and 2M combine in 1A2 to give an output signal. The output signals of 2A1 or 1A2 operates 2A2 to supply signals to the amplifier P.

For Inch operation, the logic circuit is not used. The operator, by closing the Selector Inch switch 32 and by depressing the Inch push button 37, supplies power from L2 through LS5, and conductor 61, and from L3 through conductor 63 to the clutch controlling solenoid S turning it on and off at the choice of the operator.

The trouble relay 21 has its speed of response slowed down by a shunt capacitor 70 and a series diode 71 so that the control relay is given a chance to act first in responding to trouble. The trouble relay is energized by connection through conductor 72 to line L3, and through normally closed contacts CR4 of the control relay, resistor 73 and conductors 74 and 53 to amplifier P. When the trouble relay is energized, it opens its contacts 20 in series with the line starter LS, deenergizing the latter and shutting down the press.

A red indicator lamp 76 is connected in series with the normally closed contacts CR3 of the control relay to line L3 and the amplifier P, and gives an indication of output from the amplifier. When the amplifier loses its bias, it will have an undesired output, and the lamp will show this. It will also show failure of the control relay when the amplifier has an output to which the control relay does not respond.

From the foregoing description, it should be apparent that we have provided a system for the control of a punch press using static logic decision units which have no contacts or other moving parts resulting in maximum life and minimum maintenance.

We claim as our invention:

1. A control system for a load having an electric motor for driving the load, and having a clutch for connecting the motor to and disconnecting the motor from the load, comprising, means for operating said clutch, a MEMORY unit having on and off inputs and an output, a NOT unit, means connecting the output of said NOT unit to said off input of said MEMORY unit, a Selector switch, a Run switch having normally closed contacts which open when said Run switch is closed, said Run switch having normally open contacts which close when said Run switch is closed, means including said Selector switch and said normally closed contacts for supplying a signal to said on input of said MEMORY unit, and for supplying a signal to the input of said NOT unit, a first two-input AND unit, means including said normally open contacts of said Run switch when said Run switch is closed for supplying a signal to one input of said AND unit, means connecting the output of said MEMORY unit to the other input of said AND unit, a second AND unit, means connecting the output of said first AND unit to the input of said second AND unit, and means including means using the output signals of said AND units adapted to be connected to said means for causing operation of said clutch to connect said motor to said load.

2. A control system for a load having an electric motor for driving the load, and having a clutch for connecting said motor to and disconnecting said motor from the load, comprising, means for causing operation of said clutch, a first MEMORY unit having on and off inputs and an output, a NOT unit, means connecting the output of said NOT unit to the off input of said MEMORY unit, a Selector switch, a Run switch having normally closed contacts which open when said Run switch is closed, and having normally open contacts which close when said Run switch is closed, means including first limit switch means driven by said load, said Selector switch and said normally closed contacts for supplying a signal to said on input of said MEMORY unit and for supplying a signal to the input of said NOT unit, a first two-input AND unit, a second MEMORY unit having on and off inputs and an output, means including said normally open contacts of said Run switch when said Run switch is closed for supplying signals to one input of said AND unit and to said on input of said second MEMORY unit, means connecting the output of said first MEMORY unit to the other input of said first AND unit, a second two-input AND unit, means connecting the output of said first AND unit to both inputs of said second AND unit, means including means using the output signals of both of said AND units adapted to be connected to said means for causing operation of said clutch to connect said motor to said load, a second NOT unit having its output connected to said off input of said second MEMORY unit and normally having an output signal so that said second MEMORY unit has no output signal, a third two-input AND unit, second limit switch means driven by said load, means including said second limit switch means for delivering a signal to the input of said second NOT unit for turning said second MEMORY unit on, and delivering a signal to one input of said third AND unit, means connecting the output of said second MEMORY unit to the other input of said third AND unit, means connecting the output of said third AND unit to the input of said second AND unit, and means including means using the output signals of said second and third AND units adapted to be connected to said means for causing said clutch to continue to connect said motor to said load.

3. A control system as claimed in claim 2 in which said first limit switch means removes said signal to said first NOT unit after a predetermined angular movement of the motor after operation of the clutch for turning off said first MEMORY unit, and then restores said signal to said first NOT unit for permitting said first MEMORY unit to be turned on at the beginning of the next cycle.

4. A control system as claimed in claim 3 in which said second limit switch means after further angular movement of the motor after operation of the clutch removes said signals from said second NOT unit and said one input of said third AND unit for causing said clutch to be disengaged.

5. A control system as claimed in claim 2 in which said second limit switch means after a predetermined angular movement of the motor after operation of the clutch removes said signals from said second NOT unit and said one input of said third AND unit for causing said clutch to be disengaged.

6. A control system for a load having an electric motor for driving the load, and having a clutch for connecting the motor from the load, the motor to and disconnecting the motor from the load, comprising, means for causing operation of said clutch, a MEMORY unit having on and off inputs and an output, a first two-input AND unit, a NOT unit, means connecting the outputs of said AND and NOT units to the off input of said MEMORY unit, a Selector switch, a Run switch having normally closed contacts which open when said Run switch is closed, said Run switch having normally open contacts which are closed when said Run switch is closed, means including said Selector switch and said normally closed contacts for supplying a signal to said on input of said MEMORY unit, for supplying a signal to one input of said AND unit, and for supplying a signal to the input of said NOT unit, a second two-input AND unit, means including said normally open contacts of said Run switch when said Run switch is closed for supplying signals to the other input of said first AND unit and to one input of said second AND unit, said normally closed contacts opening when said Run switch is closed and removing the signal from said one input of said first AND unit, means connecting the output of said MEMORY unit to the other input of said second AND unit, a third AND unit, means connecting the output of said second AND unit to the input of said third AND unit, and means including means using the outputs of said second and third AND units adapted to be connected to said means for causing said clutch to connect said motor to said load, said normally closed contacts if closed while said Run switch is closed will allow reapplication of a signal to said one input of said first AND unit for causing it to turn off said MEMORY unit.

7. A control system for a load having an electric motor for driving the load, and having a clutch for connecting the motor to and disconnecting the motor from the load, comprising, means for causing operation of said clutch, a first MEMORY unit having on and off inputs and an output, a first two-input AND unit, a NOT unit, means connecting the outputs of said AND and NOT units to the off input of said MEMORY unit, a Selector switch, a Run switch having normally closed contacts which open when said Run switch is closed, said Run switch having normally open contacts which close when said Run switch is closed, means including said Selector switch, first limit switch means driven by said load, and said normally closed contacts for supplying signals to said on input of said MEMORY unit, to the input of said NOT unit and to one input of said AND unit, a second two-input AND unit, a second MEMORY unit having on and off inputs and an output, means including said normally open contacts of said Run switch when said Run switch is closed for supplying signals to the other input of said first AND unit, to one input of said second AND unit and to said on input of said second MEMORY unit, said normally closed contacts opening when said Run switch is closed and removing the signal from said one input of said first AND unit, means connecting the output of said first MEMORY unit to the other input of said second AND unit, a third AND unit, means connecting the output of said second AND unit to the input of said third AND unit, means including means using the output signals of said second and third AND units adapted to be connected to said means for causing said clutch to connect said motor to said load, a second NOT unit, means connecting the output of said second NOT unit to said off input of said second MEMORY unit, said second NOT unit normally having an output signal so that said second MEMORY unit has no output signal, a fourth two-input AND unit, second limit switch means driven by said load, means including said second limit switch means for delivering a signal to said second NOT unit for turning said second MEMORY unit on, and for delivering a signal to one input of said fourth AND unit, means connecting the output of said second MEMORY unit to the other input of said fourth AND unit, means connecting the output of said fourth AND unit to the input of said third AND unit, and means using the outputs of said third and fourth AND units adapted to be connected to said means for causing said clutch to continue to connect said motor to said load after said Run switch is opened, said normally closed contacts if closed while said Run switch is closed will allow reapplication of a signal to said one input of said first AND unit for causing it to turn off said MEMORY units.

8. A control system as claimed in claim 7 in which said first limit switch means removes said signal from said first NOT unit after a predetermined angular movement of the motor after operation of said clutch for turning off said first MEMORY unit, and then restores said signal to said first NOT unit for permitting said first MEMORY unit to be turned on at the beginning of the next cycle.

9. A control system as claimed in claim 8 in which said second limit switch means after further angular movement of the motor after operation of the clutch removes said signal from said second NOT unit and said one input of said fourth AND unit for causing said clutch to be disengaged.

10. A control system as claimed in claim 7 in which said second limit switch means after a predetermined angular movement of the motor after operation of said clutch removes said signals from said second NOT unit and said one input of said fourth AND unit for causing said clutch to be disengaged.

References Cited in the file of this patent

UNITED STATES PATENTS

| | | |
|---|---|---|
| 2,259,574 | Lillquist | Oct. 21, 1941 |
| 2,471,505 | Winther | May 31, 1949 |
| 2,695,993 | Haynes | Nov. 30, 1954 |
| 2,745,530 | Foster | May 15, 1956 |
| 2,753,545 | Lund | July 3, 1956 |
| 2,818,150 | Eck et al. | Dec. 31, 1957 |